July 25, 1967   C. W. CARSON   3,332,633
COIL WINDING APPARATUS
Filed April 1, 1965   3 Sheets-Sheet 2
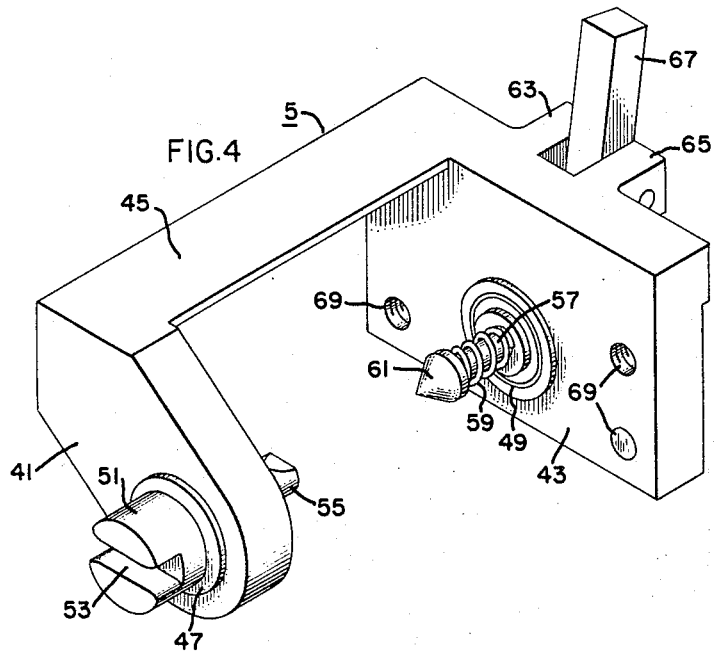
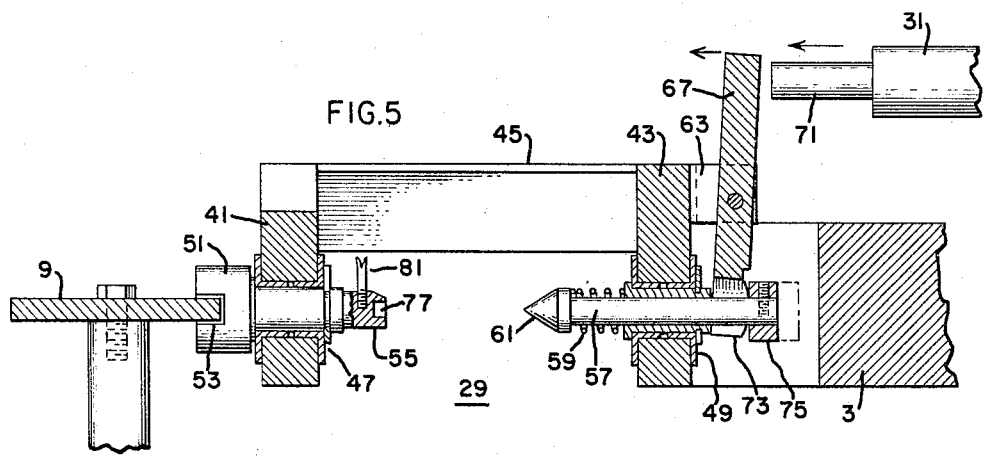
INVENTOR:
CHARLES W. CARSON,
BY William S. Wolfe
HIS ATTORNEY.

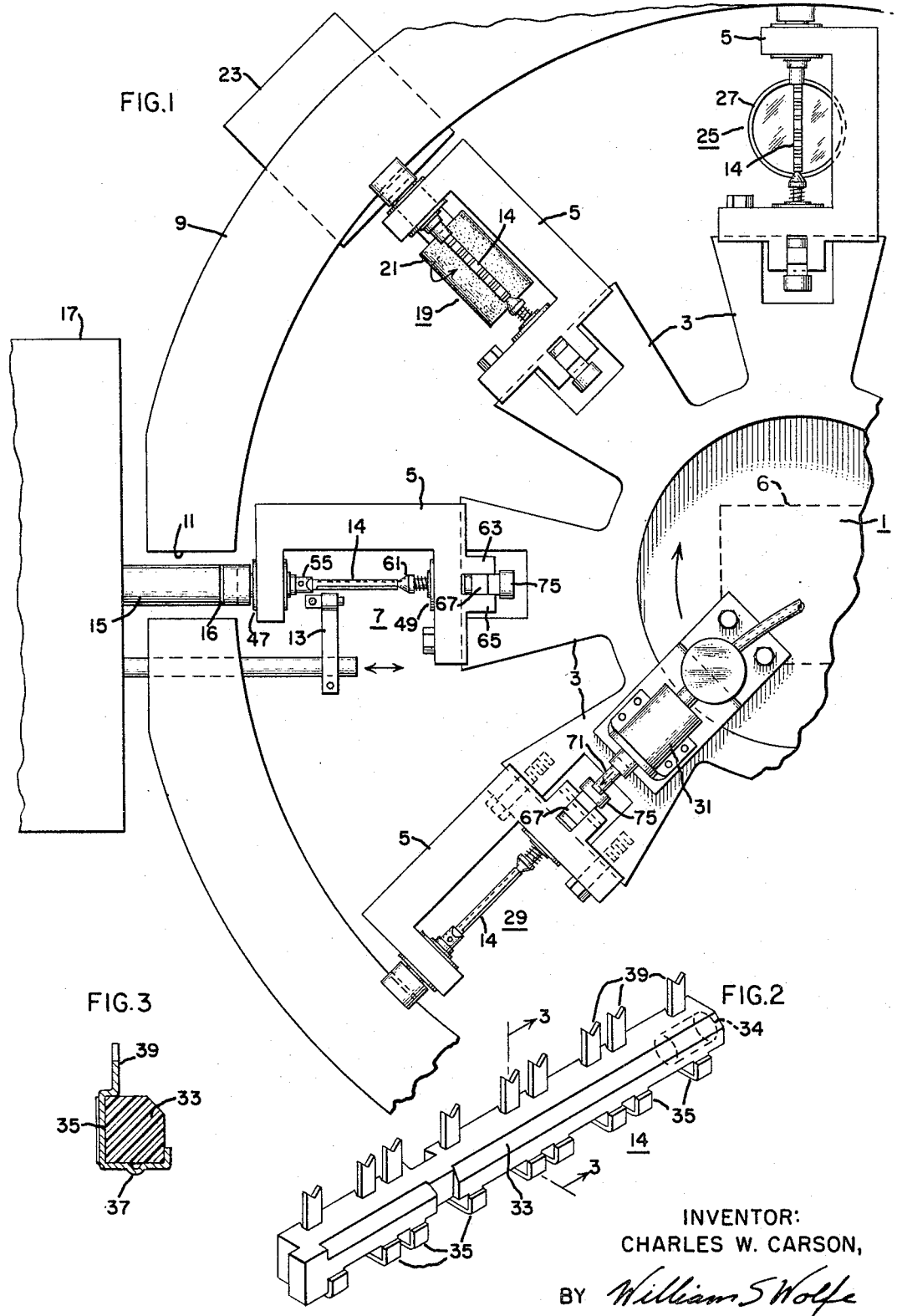

July 25, 1967  C. W. CARSON  3,332,633
COIL WINDING APPARATUS
Filed April 1, 1965  3 Sheets-Sheet 3
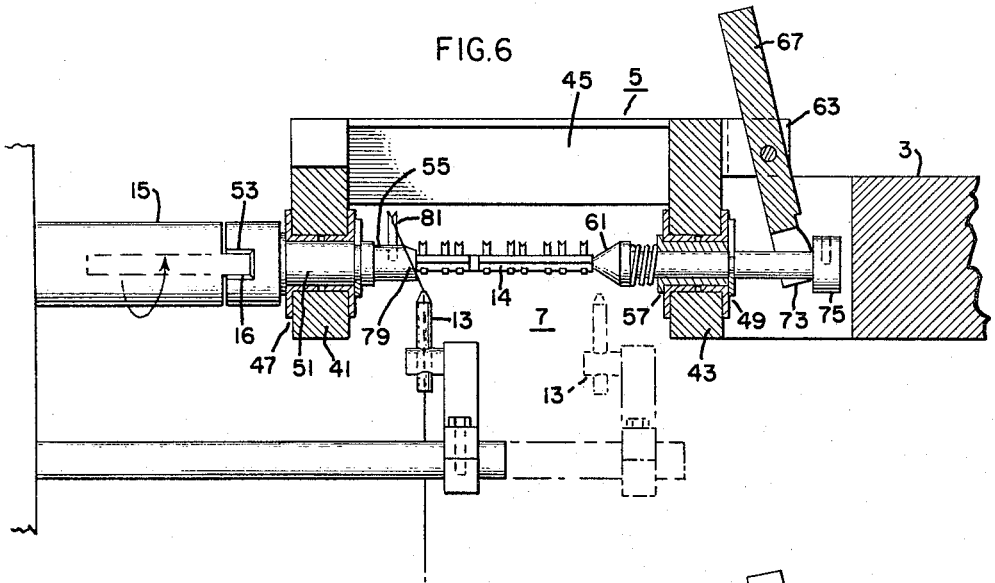
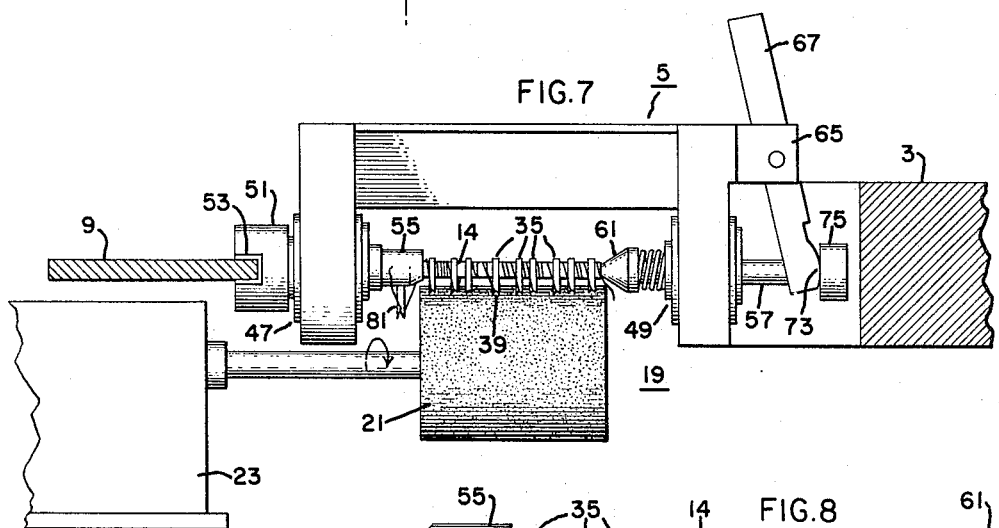
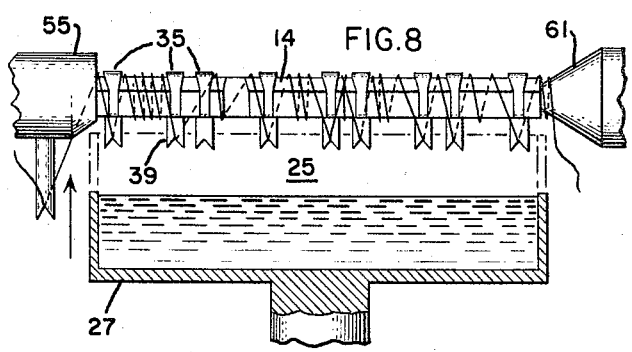
INVENTOR:
CHARLES W. CARSON,
BY *William G. Wolfe*
HIS ATTORNEY.

3,332,633
Patented July 25, 1967

3,332,633
COIL WINDING APPARATUS
Charles W. Carson, East Syracuse, N.Y., assignor to General Electric Company, a corporation of New York
Filed Apr. 1, 1965, Ser. No. 444,726
7 Claims. (Cl. 242—9)

ABSTRACT OF THE DISCLOSURE

Apparatus for rotating coil form holders from one station to another where operations such as winding, tinning and soldering can be performed. Each coil form is held between a retractable dead spindle and a live spindle on a holder. The live spindle has a slot for engaging the coil form and also a slot for engaging a drive shaft. An aligning track engages the slots in the live spindle when the coil holders are being rotated from one station to the next.

---

The present invention relates to an apparatus for winding coils and more specifically towards such an apparatus for winding variable pitch coils upon a relatively fragile coil form.

In many applications modern electronic equipment requires the use of miniature coils wound on relatively fragile coil forms. The winding of such coils on fragile coil forms raises a number of serious handling problems during fabrication. Such problems are intensified where mass production requirements are such that the coils must be wound in rapid fashion by a semi-automatic or automatic machine.

As an example of the problems encountered in winding such coils, the miniaturized VHF tuners conventionally employed in television receivers employ thirteen relatively fragile tuner strips, each strip serving as a coil form and having a plurality of variably pitched tuning coils wound thereon. Thus, a large number of such tuner strips must be wound in rapid fashion in order to provide compatibility with mass production of television receivers.

The prior art coil winding machines were not suited for semi-automatic winding of relatively fragile coil forms in general or of the above described tuner strips in particular. In this regard, the prior art machines wherein mandrels extending through the coil form were employed were not suitable since the coil forms because of their fragility could not be provided with the necessary central aperture. Similarly, the prior art machines whereby the coil form was grasped at one end were not satisfactory since the fragile coil forms were easily damaged in this manner.

The present invention presents a semi-automatic machine for winding a variably pitched winding on a relatively fragile coil form in such a manner that damage to the coil forms is prevented.

Thus, an object of the invention is to provide an improved coil winding apparatus.

Another object is to provide a coil winding apparatus suitable for semi-automatic winding of relatively fragile coil forms.

Yet, another object is to provide a coil winding apparatus suitable for winding a variable pitch winding on a relatively fragile coil form such as the tuner strip of a television receiver.

These and other objects are achieved in one embodiment of the invention through the use of a coil form holder having first and second generally parallel leg portions and having a transverse body portion formed integrally with adjacent ends of the first and second leg portions. A bearing is provided in each leg portion, the bearings being axially aligned and a live spindle being rotatably positioned in one bearing while a dead spindle is positioned in the other bearing. The live spindle is provided with an outwardly extending slotted drive portion and an inwardly extending coil form engaging portion. The dead spindle includes an inwardly extending coil form engaging portion and is spring biased in the inward direction, means being provided to axially retract this spindle to allow loading and unloading of a coil form. Through the use of such a coil form holder the coil form is rigidly held at both ends between the live and dead spindles during winding and all subsequent operations.

A plurality of such form holder units are positioned on a turntable, the turntable including means for successively indexing each of the coil form holder units to a coil winding station. Drive means are provided at the coil winding station, the drive means engaging the slot of the outwardly extending drive portion of the coil form holder unit to rotate the coil form and to allow a variably pitched winding to be wound thereon.

A track is provided surrounding the turntable, the track continuously engaging the slotted portion of the outwardly extending drive portions at all positions other than the winding station to thereby maintain a desired orientation of the coil form.

The novel and distinctive features of the invention are set forth in the appended claims. The invention itself together with further objects and advantages thereof, may best be understood by reference to the following description and accompanying drawings in which:

FIGURE 1 is a top view of a coil winding machine in accordance with the invention,
FIGURE 2 is a perspective view of a representative coil form which might be wound in the machine of FIGURE 1,
FIGURE 3 is a sectional view taken along line 3—3 of FIGURE 2,
FIGURE 4 is a perspective view of a coil form holder unit in accordance with the invention,
FIGURE 5 is a view of the coil form holder unit shown in FIGURE 3 positioned at the loading and unloading station,
FIGURE 6 is a view similar to FIGURE 4 showing a coil form positioned at the winding station,
FIGURE 7 depicts a coil form positioned at the fluxing station, and
FIGURE 8 depicts the manner in which the coil form is dip soldered at the soldering station.

Referring to FIGURE 1 there is shown a turntable 1 including a plurality of radially extending arms 3, each arm having a coil form holder unit 5 affixed thereto. Conventional drive means generally designated 6 are provided for successively indexing each of the coil form holders 5 to a winding station generally designated 7. The drive means 6 may be any of a number of such drive means available in the marketplace, for example, rotary work feeders available from the Mead Specialties Company of Chicago, Illinois. A track 9 surrounds the turntable, the track serving as a reference for the coil form holders and including an opening 11 at the winding station 7.

The winding station 7 includes a conventional winding guide 13 arranged to wind a variable pitch winding on a coil form 14 positioned in the coil form holder 5. A rotatable drive shaft 15 having an extending key portion 16 is provided to engage the coil form holder 5 at the winding station 7 in order to rotate the coil form 14. The key portion 16 is aligned with the track 9 during indexing of the turntable, the key portion 16 thus in effect providing a continuation of the track 9 during indexing. A drive means 17 is provided for rotating the drive shaft 15 and for causing the winding guide 13 to move along the coil form 14 to wind a variable pitch winding thereon. The drive means 17 can be any suitable means such as for example a conventional cam and cam follower system for providing a desired winding distribution.

Upon completion of the operation at the winding station 7 the wound coil form is indexed to the fluxing station 19. At this station a rotating flux carrying brush 21 is caused to apply flux to the coil form 14 in a suitable fashion, the flux brush 21 being driven by a conventional drive means 23.

After fluxing the wound and fluxed coil form 14 is indexed to soldering station 25. At this station a solder pot 27 containing molten solder is utilized to effect the necessary solder connections.

Subsequent to the soldering station 25 a number of other stations (not shown) can be provided to perform various other functions such as color coding, lead clipping, etc.

After the desired operations have been performed upon the wound coil form 14 the coil form is indexed to a loading and unloading station 29. At this station an air piston 31 is employed to disengage the coil form 14 from the associated coil form holder to allow removal of the wound coil form and insertion of a new coil form.

Referring to FIGURES 2 and 3 there is shown a representative coil form 14 of the type for which the winding machine of the invention is especially suited. The coil form 14 generally comprises a ceramic body portion 33 having an axially extending circular hole 34 at one end thereof and a plurality of integral contact and terminal member 35. The contact and terminal members 35 include a contact portion 37 and an extending notched terminal portion 39. The depicted coil form finds application in miniature television tuners of the turret type and being quite fragile in nature cannot be wound in satisfactory fashion by prior art machines. The winding machine of the invention finds particular application in winding such tuner strips but is not limited thereto and may be utilized in conjunction with other types of coil forms.

Referring to FIGURE 4 there is shown a detailed perspective view of the coil form holder 5 depicted in FIGURE 1. The coil form holder 5 comprises first and second generally parallel leg portions 41 and 43 respectively, a transverse body portion 45 being formed integrally with adjacent ends of the leg portions. Bearings 47 and 49 are positioned in the leg portions 41 and 43 respectively. A live spindle shown generally at 51 is rotatably positioned in the bearing 47, the live spindle including a drive portion having a slot 53 therein and an inwardly extending coil form engaging portion 55. The slot 53 is slightly larger than the key portion 16 of shaft 15 as shown more clearly in FIGURE 6.

A dead spindle generally shown at 57 is rotatably positioned in the bearing 49. The dead spindle 57 is axially retractable and includes a spring 59 to bias the spindle in the inward direction. The dead spindle 57 is provided with a conical end portion 61 adapted to engage the hole 34 of the coil form 14.

A pair of spaced outwardly extending fingers 63 and 65 are provided on leg portion 43, a lever 67 being pivoted between these fingers for retraction of the dead spindle 57. A plurality of mounting holes 69 are provided in the leg 43, the holes 69 being adapted to receive bolts for assembling the coil form holder to the turntable.

Referring to FIGURE 5 there is shown a sectional view of the coil form holder of FIGURE 4 positioned at the loading and unloading station 29 of FIGURE 1. As depicted the slot 53 in the live spindle 51 is engaged by the track 9, the track 9 similarly engaging the live spindle 51 at all stations other than the winding station in order to maintain the coil form in the desired orientation. The dead spindle 57 is retracted by the extension of the rod 71 when air piston 31 is energized, thus causing the lever 67 to pivot in the direction as indicated thereby causing the pad 73 at the extremity of the lever 67 to engage a shoulder 75 on the dead spindle to exert an outward retracting force thereon. With the dead spindle 57 in the retracted position a coil form is inserted in a rectangular hole 77 provided on the coil form engaging portion 55 of the live spindle 51, the size of the hole 77 being such that the coil form is restrained from turning with respect to the spindle 51. The air piston 31 is then deenergized thereby retracting the rod 71 and allowing the spring 59 to urge the conical portion 61 of the dead spindle 57 into the hole 34 of the coil form. The air piston 31 is similarly actuated to remove a completed coil from the coil form holder 5.

Referring to FIGURE 6 the coil form holder 5 including a coil form 14 is shown at the winding station 7 of FIGURE 1. In this position, a wire 79 passing through the winding guide 13 from a suitable wire supply (not shown) is attached to a clip 81 by the operator prior to the initiation of the winding operation. Since the extending key portion 16 of shaft 15 is aligned with the track 9 during indexing of the turntable, the key portion 16 will automatically be received by the slot 53 of live spindle 51. Rotation of the shaft 15 by the drive means thus causes the coil form 14 to rotate, the drive means also causing the winding guide 13 to advance along the coil form to provide a desired winding distribution thereon. In the particular coil form shown the wire 79 is caused to pass over the notches in terminal portions 39 to thereby define a plurality of coils between the various terminals.

Referring to FIGURE 7 the coil form holder 5 in which is held a wound coil form 15 is shown positioned at the fluxing station 19. In this position the slot 53 of the live spindle 51 remains engaged by the track 9 to maintain the coil form 14 in the desired orientation. The orientation in this instance is with the extending terminal portions 39 of the coil form unit 14 extending downwardly so as to contact the rotating flux brush 21 driven by drive means 23. In this manner flux is applied to the terminals 39 so that the coil wires engaging these terminals are readily soldered thereto by a subsequent soldering operation.

Referring to FIGURE 8 the coil form 14 is depicted at the soldering station 25 of FIGURE 1. At this station the solder pot 27 containing molten solder therein is automatically moved upwardly to effect dip soldering of the wires of the coil to the associated terminals 39.

Thus the invention provides for the holding of relatively fragile coil forms at both ends during winding and all subsequent operations to prevent damage to such coil forms. Further, the coil form holders of the invention provide for semi-automatic winding of relatively fragile coil forms in rapid and efficient fashion.

It should be noted that various other stations might be provided other than those shown in order to perform any number of additional operations. Further, the track 9 may be provided with further openings similar to the opening 11 to allow rotation of the coil form for purposes other than winding. For example, in some instances the coil form might be rotated by 180° subsequent to a clipping or similar operation.

Although the invention has been described with respect to certain specific embodiments it will be appreciated that further modifications and changes may be made by those skilled in the art without departing from the true spirit and scope of the invention. Specifically, although a semi-automatic machine has been described the invention might advantageously be employed in a completely automatic machine.

What I claim and desire to secure by Letters Patent of the United States is:

1. A coil winding apparatus for winding a variable pitch winding on a coil form;
   (a) a plurality of coil form holder units, each unit comprising first and second generally parallel leg portions having a transverse body portion formed integrally with adjacent ends of said first and second leg portions, said first leg portion including means for rotatably engaging the first end of the coil form, said means including a slotted outwardly extending drive portion, said second leg portion including means for rotatably engaging the second end of the coil form, (b) a rotatable turntable having said coil form holder units positioned thereon in spaced relationship and including means for successively indexing each of said units to a coil winding station, (c) winding guide means positioned at said coil winding station and arranged to transport a wire along the length of the coil form, (d) drive means adapted to engage the slot of said outwardly extending drive portion to rotate the coil form and to cause said winding guide to advance along the length of the coil form, and (e) track means surrounding said turntable and arranged to continuously engage the slotted drive portion of each of said units at positions other than said winding station to maintain the coil form in a desired orientation.

2. The apparatus defined in claim 1 wherein said means for rotatably engaging the first end of the coil form comprises a live spindle rotatably positioned in a bearing mounted on said first leg portion, and said means for rotatably engaging the second end of the coil form comprises a dead spindle rotatably positioned in a bearing mounted on said second leg portion.

3. The apparatus defined in claim 2 wherein said live spindle is provided with an inwardly extending coil form engaging portion.

4. The apparatus defined in claim 2 wherein said dead spindle is axially retractable, said dead spindle being provided with an outwardly extending portion having a shoulder thereon and an inwardly extending coil form engaging portion.

5. The apparatus defined in claim 4 wherein means are provided for spring biasing said dead spindle in an inward direction.

6. The apparatus defined in claim 5 wherein said coil form holder unit further includes a lever for engaging said shoulder of said dead spindle to axially retract said dead spindle.

7. The apparatus defined in claim 6 wherein a coil form loading and unloading station is provided including means for operatively engaging said lever to axially retract said dead spindle.

References Cited
UNITED STATES PATENTS

| | | | |
|---|---|---|---|
| 1,955,489 | 4/1934 | Duncan et al. | 242—68.4 |
| 2,514,970 | 7/1950 | Prickett | 242—9 X |
| 3,090,569 | 5/1963 | Beushausen | 242—9 |
| 3,106,351 | 10/1963 | Fulton | 242—9 |
| 3,136,493 | 6/1964 | Swanson | 242—9 |
| 3,224,702 | 12/1965 | Jones et al. | 242—68.4 |

FRANK J. COHEN, *Primary Examiner.*

BILLY S. TAYLOR, *Examiner.*